United States Patent [19]

Zimmermann

[11] 4,056,978

[45] Nov. 8, 1977

[54] PROBE FOR MEASURING LIQUID LEVELS

[75] Inventor: Heino Zimmermann, Bremen, Germany

[73] Assignee: Gustav F. Gerdts KG, Bremen, Germany

[21] Appl. No.: 694,736

[22] Filed: June 10, 1976

[30] Foreign Application Priority Data

July 17, 1975  Germany .......................... 2531915

[51] Int. Cl.² ............................................. G01F 23/24
[52] U.S. Cl. .................... 73/304 R; 340/244 C
[58] Field of Search ................. 73/40, 304 R, 304 C; 340/242, 244 C; 324/61 P

[56] References Cited

U.S. PATENT DOCUMENTS

| | | | |
|---|---|---|---|
| 3,131,335 | 4/1964 | Berglund et al. | 73/304 R X |
| 3,339,411 | 9/1967 | Riffie | 73/304 R |
| 3,360,991 | 1/1968 | Hoss et al. | 73/304 R |
| 3,678,749 | 7/1972 | Harper | 73/304 R |
| 3,789,297 | 1/1974 | Frolich | 340/242 X |
| 3,956,760 | 5/1976 | Edwards | 340/244 X |

Primary Examiner—Richard C. Queisser
Assistant Examiner—John S. Appleman
Attorney, Agent, or Firm—Allison C. Collard

[57] ABSTRACT

A probe for detecting the level of electrically conductive liquids in a walled container having an inner chamber consisting of a probe housing having a bottom portion for insertion into the chamber of the walled container, and an inner chamber, an insulated packing secured in the housing on the bottom portion, at least one compensating electrode having an insulating jacket and disposed through the packing, the insulating jacket penetrating the packing and extending into the container and at least one measuring electrode having an insulating jacket and disposed through the packing, wherein the electrode is elongated and spaced apart from the compensating electrode and extends beyond its insulating jacket into the container.

6 Claims, 4 Drawing Figures

PROBE FOR MEASURING LIQUID LEVELS

The invention relates to a probe for the level control of electrically conductive liquids.

Probes of this type may be used in containers which are under excessive pressure. Furthermore, these probes are simple in design, and are constructed to permit easy manufacturing. The known embodiments are disadvantageous in that a fine moisture film accumulates on the electrode and the electrode housing which results in an erroneous or wrong signal.

In probes which have a different structure (German Pat. No. 2,204,805), it is known that a wrong signal caused by the aforementioned moisture film can be prevented by providing a compensation electrode. However, due to the different structure of the insulation element, this solution of the problem is not feasible in probes of the aforementioned type.

It is therefore an object of the invention to provide a probe with a packing-like insulation element which is provided with a compensation electrode for preventing wrong signals caused by moisture film. Furthermore, an automatic control of the probe to detect leakage is provided. The insulation jackets of the invention provide defined insulation paths of even length on the measuring as well as on the compensation electrode. Moisture films on these insulation paths result in a corresponding long leakage current from the electrodes to the electrode housing, independent of conductivity fluctuations. When the two electrodes are connected to a measuring or resistance bridge circuit in a manner that they effect opposed mistuning of the bridge diagonal, the leakage currents are without influence on the measuring result. If the probe is arranged so that the predetermined liquid is reached, when both the measuring and the compensation electrode are submerged into the liquid, fluctuations in liquid conductivity are also compensated. In the invention, coarse or approximate tolerances for the length of the insulation jackets which extend from the probe housing are permitted which is advantageous for the manufacturing process. The difference in length of the insulation jacket is measured on such a large scale that even for unfavorable tolerance additions on the measuring electrode, there is always a slightly longer insulation path generated than on the compensative electrode. Therefore, when moisture films are present, the danger of a bridge mistuning simulating a level signal is not present.

The invention also includes an automatic self control of the probe with respect to leakage of the packing box. The inventive device prevents liquid, which may penetrate the probe housing, from resulting in a conductivity between the measuring electrode and the probe housing, thus simulating a level signal. However, a signal is given by the compensation electrode. This signal is opposed to the level signal and is therefore recognizable as an interference signal.

The invention also provides for an early detection and signaling interference of only very minute liquid which may have penetrated. There is also a feature for providing an early detection and signaling interference if leakage of the packing box occurs in the range of the measuring electrode. In a further embodiment, there are a plurality of measuring electrodes in a probe.

Other objects and features of the present invention will become apparent from the following detailed description when taken in connection with the accompanying drawings which disclose an embodiment of the invention. It is to be understood that the drawing is designed for the purpose of illustration only and is not intended as a definition of the limits and scope of the invention disclosed.

In the drawings, wherein similar reference numerals denote similar elements throughout the several views.

Figure 1:
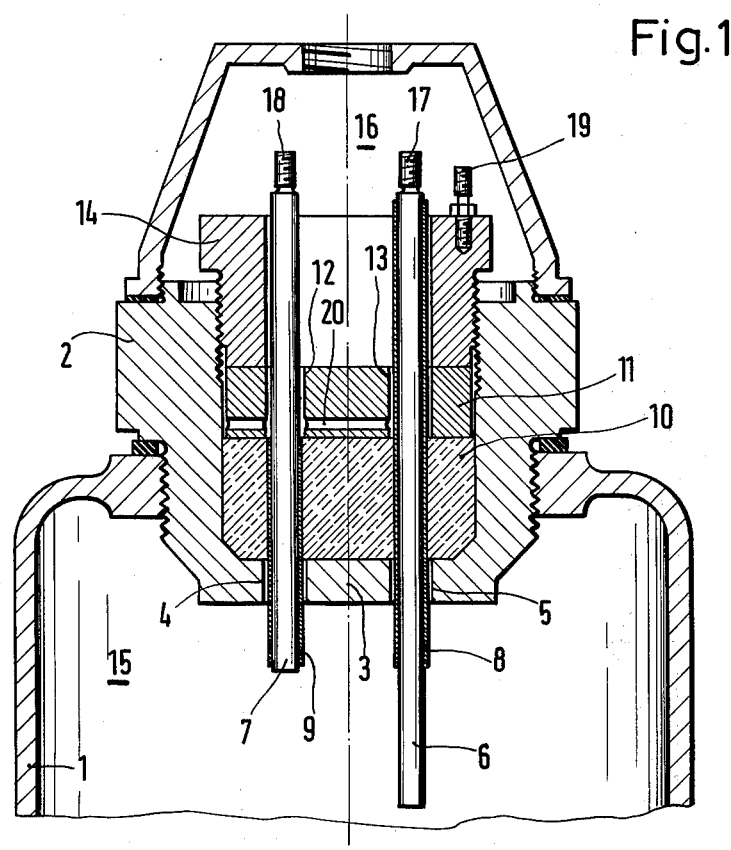
FIG. 1 shows an inventive probe with a measuring electrode.

Referring to FIG. 1, there is shown a probe housing 2, screwed into a wall 1 of a liquid container which is shown in cross-section. Bottom 3 of the housing is provided with two openings 4 and 5 which are penetrated by two rod electrodes of different length. The longer electrode is a measuring electrode 6, and the shorter one is a compensation electrode 7. A certain part of the total length of both electrodes are surrounded by hose-like insulation jackets 8 and 9 and a polytetrafluoroethylene packing box 10. Box 10 serves as a seal, and is also an insulation element, and is held in place by a pressure plate 11, which also is provided with openings 12 and 13 for electrodes 6 and 7. Packing box 10 is held under tension in probe housing 2, by screw ring 14, and provides the required seal between the inner chambers 15 and 16 of the liquid container and probe housing 2. Moreover, packing box 10 electrically insulates electrodes 6 and 7 with respect to probe housing 2. A further insulation is provided by insulating jackets 8 and 9 which both extend into the inner chamber 15 of the container in equal length far beyond insulation element 10 and housing bottom 3. In the inner chamber 16 of probe housing 2, the insulation jacket 9 of compensation electrode 7 ends at the same level as the top surface of packing box 10, while on measuring electrode 6, insulation jacket 8 extends to the connecting or terminal end 17. Connecting or terminal ends 18 and 19 are the connecting ends for compensation electrode 7 and probe housing 2, which serve together with container wall 1 as the counter potential for electrodes 6 and 7. Finally, pressure plate 11 is provided with a lateral channel 20.

Figure 2:
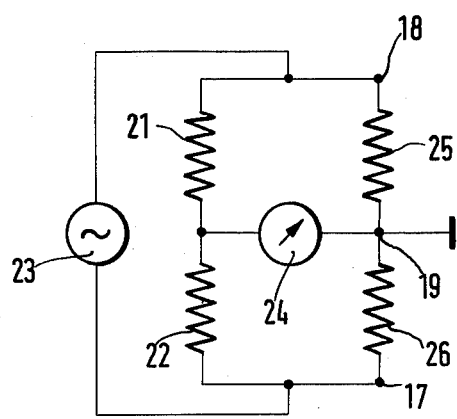
FIG. 2 shows a measuring bridge circuit for the probe of FIG. 1.

The probe as shown in FIG. 2 is connected to a measuring bridge circuit which comprises two stationary resistors 21 and 22, a voltage supply 23, as well as a signal receiver or detector 24 in the bridge diagonal. If insulation jackets 8 and 9 which extend into inner chamber 15 of the container show liquid films because moisture is immediately admitted or because liquid vapor or fog has deposited on the insulation jackets, these films form electrically conductive connections to probe housing 2. These conductive connections or paths are of the same dimension, and can be represented by two resistors 25 and 26 of same magnitude in FIG. 2. Hence, the bridge circuit is defined as being balanced. The effect of the liquid films has therefore been compensated. Should packing box 10 weaken in its tightness, and should liquid penetrate into inner chamber 16 of the housing, a low ohmic resistance is formed between compensation electrode 7 and pressure plate 11 which is conductively connected to probe housing 2, so that the connected bridge circuit is mistuned in the opposite direction of the submerged measuring electrode 6. This mistuning can be interpreted as an interference. Should the packing box leak at measuring electrode 6, the lateral channel 20 quickly guides the penetrated liquid to compensation electrode 7. If an arrangement is set up so that when the predetermined level is reached, both electrodes 6 and 7 are simultaneously submerged into the liquid to be controlled, resistors are formed between measuring electrode 6 and container wall 1, as well as between compensation electrode 7 and container wall 1, the ratio of which is defined only by the exposed electrode surfaces in the liquid. The conductivity and therefore eventual conductive fluctuations are eliminated from the measuring result.

Figure 3:
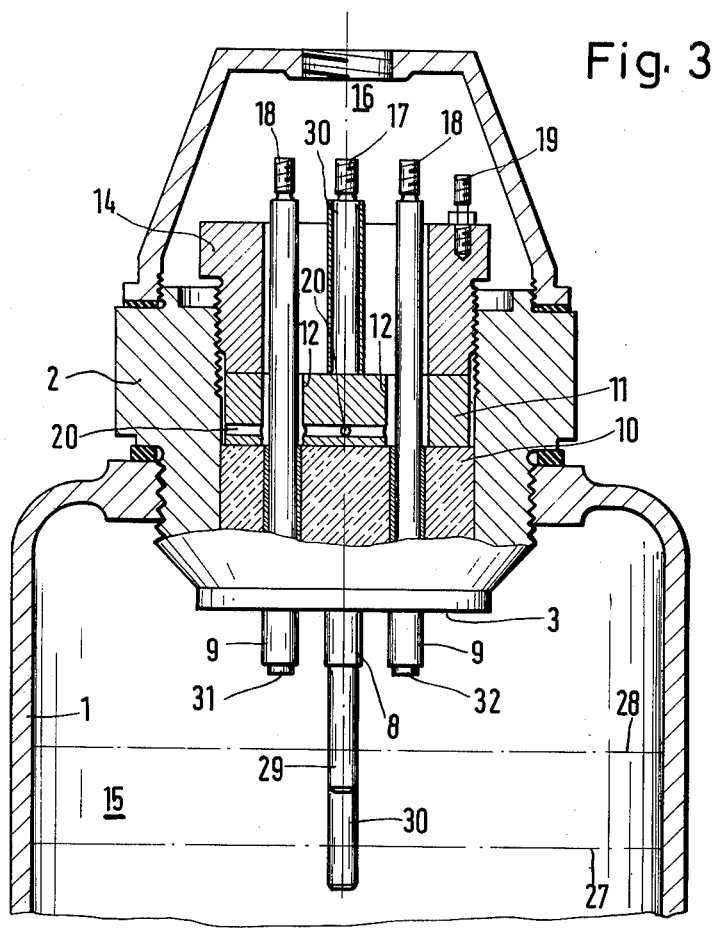
FIG. 3 shows an inventive probe with two measuring electrodes.
Figure 4:
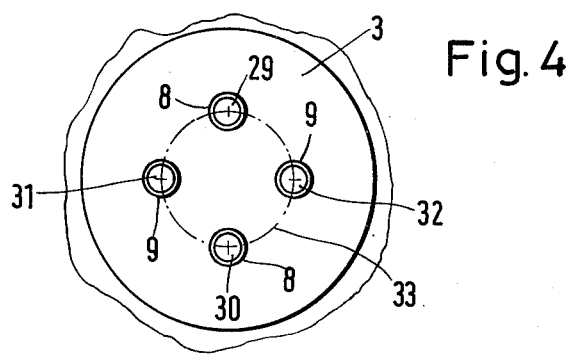
FIG. 4 is a bottom view of the probe of FIG. 3.

The probe embodiment in accordance with FIGS. 3 and 4 controls two different liquid levels 27 and 28. This probe differs from the probe of FIG. 1 only in that two measuring electrodes 29 and 30 as well as two compensation electrodes 31 and 32 are provided. The latter extend equally from bottom 3 of probe housing 2. The measuring electrodes 29 and 30 extend in unequal length from bottom 3 corresponding to liquid levels 27 and 28 to be controlled. The segments of insulation jackets 8 and 9, which are in inner chamber 15 of the container, are of equal length. Measuring electrodes 29 and 30 and compensation electrodes 31 and 32 are alternately arranged on a bolt hole or circle 33. Due to this symmetric arrangement of the electrodes with respect to each other, and to probe housing 2 or container housing 1, respectively, a changed influence of liquid films on the level signal is eliminated even when two measuring electrodes 29 and 30 are provided.

While only a few embodiments of the present invention have been shown and described, it will be obvious to those skilled in the art that many changes and modifications may be made thereunto without departing from the spirit and scope of the invention.

What is claimed is:

1. A probe for detecting the level of electrically conductive liquids in a walled container having an inner chamber comprising:
    a probe housing having a bottom portion for insertion into the chamber of the walled container, and an inner chamber;
    insulating packing means secured in said housing on said bottom portion within the inner chamber;
    at least one compensating electrode having an insulating jacket and disposed through said packing means, the insulating jacked penetrating said packing means and extending into said container; and
    at least one measuring electrode having an insulating jacket and disposed through said packing means, said measuring electrode being spaced apart and elongated with respect to said compensating electrode and wherein its insulating jacket penetrates said packing means and extends into said container to substantially the same extent as said jacket of said compensating electrode with said jacket of said measuring electrode extending into said container at least as far as the insulating jacket of said compensating electrode.

2. The probe in accordance with claim 1, wherein the insulation jacket of said at least one measuring electrode extends slightly farther from said packing means and housing bottom into said container than the insulation jacket of said at least one compensating electrode.

3. The probe in accordance with claim 1, wherein the insulating jacket of said at least one measuring electrode extends into the inner chamber of said probe housing, while said at least one compensating electrode is not insulated in the probe housing inner chamber.

4. The probe according to claim 3, wherein the insulation jacket of said at least one compensating electrode terminates inside said probe housing adjacent to the top surface of said packing means.

5. The probe according to claim 3 comprising a pressure plate disposed against the top surface of said packing means, said pressure plate having holes for receiving said electrodes, and a lateral channel formed in said pressure plate and interconnecting said electrode receiving holes.

6. The probe according to claim 1 comprising a plurality of measuring electrodes and an equal number of compensating electrodes penetrating said packing means, whereby said compensating electrodes and said measuring electrodes are alternately spaced apart on a circular path.

* * * * *